(12) United States Patent
Ota

(10) Patent No.: US 6,693,373 B2
(45) Date of Patent: Feb. 17, 2004

(54) COLORED FILTER FOR USE IN XENON LAMP OR HALOGEN LAMP AND METHOD OF ASSEMBLING SAME

(76) Inventor: Tatsuya Ota, 917, Inadaminami, Nandancho, Mihara-gun, Hyogo-ken 656-0400 (JP)

( * ) Notice: Subject to any disclaimer, the term of this patent is extended or adjusted under 35 U.S.C. 154(b) by 124 days.

(21) Appl. No.: 09/945,211

(22) Filed: Aug. 31, 2001

(65) Prior Publication Data

US 2002/0027404 A1 Mar. 7, 2002

(30) Foreign Application Priority Data

Sep. 7, 2000 (JP) .......................... 2000-271603

(51) Int. Cl.⁷ ................................ H01J 61/40
(52) U.S. Cl. .................. 313/112; 313/489; 313/26; 362/293
(58) Field of Search ................. 313/112, 489, 313/17, 493, 26, 110, 479, 116; 220/2.1 R; 362/2, 147, 260, 293; 252/301.35, 301.36

(56) References Cited

U.S. PATENT DOCUMENTS 2,392,095 A * 1/1946 Lemmers .................... 313/112
2,877,139 A * 10/1959 Hyde
5,075,823 A * 12/1991 Chomyn ........................ 362/2
5,578,892 A * 11/1996 Whitman .................... 313/112

OTHER PUBLICATIONS

Two-sided, one-page color pamphlet entitled "Bellof HID System Spec 01".

* cited by examiner

Primary Examiner—Nimeshkumar D. Patel
Assistant Examiner—Joseph Williams
(74) Attorney, Agent, or Firm—Flynn, Thiel, Boutell & Tanis, P.C.

(57) ABSTRACT

A colored filter, capable of emitting stable and bluish white light without causing a pigment to peel off even after use for many hours, and easily mountable in a xenon lamp or a halogen lamp. The colored filter includes a cylindrical body defining a slit along the full length thereof. The cylindrical body is fitted over the outer periphery of a glass tube of the lamp. The interior surface of the cylindrical body is uniformly coated with a baked-on coloring composition composed of a pigment and a flux.

17 Claims, 2 Drawing Sheets

COLORED FILTER FOR USE IN XENON LAMP OR HALOGEN LAMP AND METHOD OF ASSEMBLING SAME

BACKGROUND OF THE INVENTION

1. Field of the Invention

The present invention relates to a colored filter mounted in a xenon lamp or a halogen lamp, used for automobile lighting.

2. Description of the Related Art

A conventional xenon lamp or a halogen lamp, used for automobile lighting, emits bluish white light immediately after being energized, however, there has been seen a tendency of a color temperature of the light to come down, turning a color thereof into yellow.

Further, it is possible to raise the color temperature by changing composition of a gas used in the lamps, but then there has arisen a problem that the color of the light becomes too bluish, resulting in failure to pass a compulsory automobile inspection.

It is therefore an object of the invention to provide a colored filter which can be easily mounted in a xenon lamp or a halogen lamp, used for automobile lighting, and a method of fabricating the same.

A pigment together with a binder used to be directly applied to a glass tube 11 of a conventional xenon lamp or halogen lamp. Because intense ultraviolet radiation and heat are contained in the xenon lamp or the halogen lamp, the binder has undergone degradation, causing the pigment to peel off the surface of the glass tube 11, and to adhere to a reflecting mirror, and so forth, of these lamps, thereby doing aesthetic harm to the lamps.

SUMMARY OF THE INVENTION

The invention provides a colored filter capable of emitting stable and bluish white light without causing a pigment to peel off even after use for many hours, and of being easily mounted in a xenon lamp or a halogen lamp, and a method of manufacturing the same.

A typical example of the colored filter easily mounted in the xenon lamp or the halogen lamp used for automobile lighting, according to the invention, is shown in FIG. 1.

The colored filter 2 is usually made of Pyrex glass or quartz glass, and it can be said that any material transparent and resistant to high temperature at not less than 600° C. is suitable for use in the colored filter 2.

The colored filter 2 comprises a transparent cylindrical body 21 provided with a slit 22, and the inner surface 23 of the transparent cylindrical body 21 is coated with a pigment.

The invention has another feature in that the inner surface 23 of the transparent cylindrical body 21 is coated with the pigment for coloring by use of a flux only without using a binder.

As a coating method applicable to the invention, there can be cited the dipping coat method and the spin coater method, however, the inner surface of the transparent cylindrical body is preferably coated with a coloring composition composed of a pigment and a flux by use of the spin coater method while rotating the transparent cylindrical body around the axis thereof.

More specifically, the invention provides the following.

(1) A colored filter for use in a xenon lamp or a halogen lamp, wherein the inner surface of a transparent cylindrical body is coated with only a pigment by baking.

(2) A colored filter for use in a xenon lamp or a halogen lamp as set forth under the item (1) above, wherein the transparent cylindrical body is fitted onto the outer periphery of a glass tube of the xenon lamp or the halogen lamp.

(3) A colored filter for use in a xenon lamp or a halogen lamp as set forth under the item (2) above, wherein the transparent cylindrical body is provided with a slit defined across a full length of the transparent cylindrical body in the direction of length thereof.

(4) A colored filter for use in a xenon lamp or a halogen lamp as set forth under the item (3) above, wherein a spring is provided between the transparent cylindrical body and a seat.

(5) A colored filter for use in a xenon lamp or a halogen lamp as set forth under any one of the items (1) to (3) above, wherein the pigment is of one color or not less than two colors, selected from the group consisting of blue color, yellow color, red color, green color, and violet color.

(6) A method of fabricating a colored filter for use in a xenon lamp or a halogen lamp, said method comprising steps of:

dropping a coloring composition composed of only a pigment and a flux in the interior of a transparent cylindrical body while rotating the transparent cylindrical body around the axis thereof;

uniformly coating the inner surface of the transparent cylindrical body with the coloring composition; and drying a uniform film of the coloring composition as formed before baking by heating.

DESCRIPTION OF THE PREFERRED EMBODIMENTS

Quartz glass or Pyrex is used in a transparent cylindrical body 21 for use in a filter according to the invention, and Pyrex is preferably used mainly for economic reasons.

Figure 1:
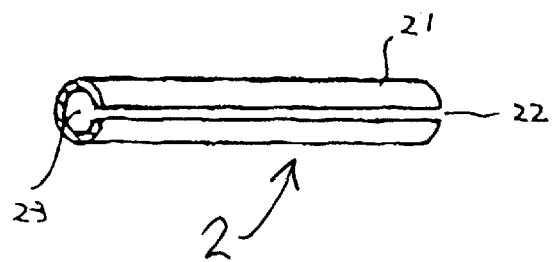
FIG. 1 is a perspective view of a first embodiment of a colored filter according to the invention.
Figure 2:
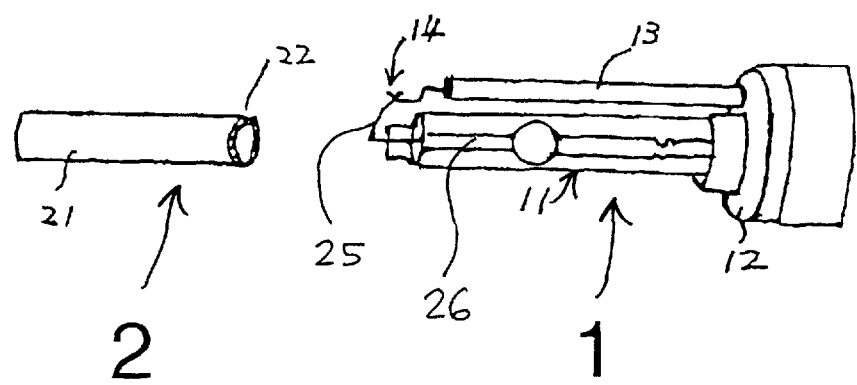
FIG. 2 is a perspective view of a xenon lamp as well as the colored filter according to the first embodiment.

As shown in FIG. 1, the transparent cylindrical body 21 is provided with a slit 22, which is necessary because in the case where a xenon lamp or a halogen lamp has already been fabricated and in place, a connection 14 of lead wires needs to be passed through the slit 22 before fitting the filter onto a glass tube of the xenon lamp or the halogen lamp so as to be mounted therein as shown FIG. 2. It follows therefore that the slit 22 is unnecessary in the case where the filter is fitted onto and mounted on the glass tube of the xenon lamp or the halogen lamp before connecting the lead wires.

Further, the slit 22 may be provided after coating the interior of the transparent cylindrical body 21 with a pigment by baking, however, even with a transparent cylindrical body already provided with the slit 22, a pigment can be applied thereto by the spin coater method.

Figure 3:
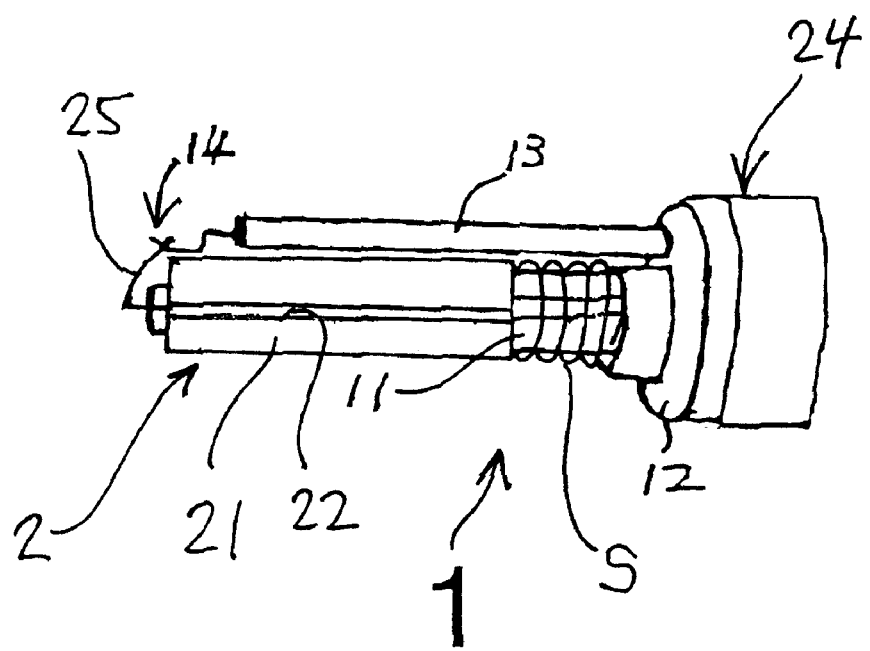
FIG. 3 is a perspective view of a spring in use with the colored filter.

In the case of the transparent cylindrical body 21 provided with the slit 22, if when the transparent cylindrical body 21 is fitted onto the glass tube 11 of the xenon lamp or the halogen lamp, the transparent cylindrical body 21 can not be retained stably due to a gap formed after such fitting as above, a spring S slightly larger in size than the outside diameter of the glass tube 11 is placed between the transparent cylindrical body 21 and a seat 12, of base 24, as shown in FIG. 3. A colored filter 2 is fitted onto the glass tube 11 such that the connection 14 of the lead wires is aligned with the slit 22, thereafter the transparent cylindrical body 21 is pushed into place as far as the outer tip thereof passes by the connection 14 of the lead wires, and subsequently, the transparent cylindrical body 21 is rotated through about 90 degrees, so that the colored filter 2 is retained between the seat 12 and the connection 14 of the lead wires by urging of the spring.

Even in the case of the transparent cylindrical body 21 being short in length, such constitution as described above is effectively applicable. Further, instead of retaining the transparent cylindrical body 21 by use of the spring, the transparent cylindrical body 21 can be securely held in place by use of a heat resistant adhesive or putty applied between the transparent cylindrical body 21 and the seat 12.

The pigment used in carrying out the invention may be either an inorganic pigment or an organic pigment, and any pigment may be used provided that it is resistant to ultraviolet radiation and heat. In particular, a pigment in a color of blue series is preferably used because young people prefer light emitted in the color of blue series. However, a color of the pigment used in carrying out the invention is not limited to one in blue series, and may be any of yellow, red, green, violet, and so forth.

A flux used in carrying out the invention may be of any kind provided that it has affinity with the pigment in use. Cited as the flux are a flux of Cellosolve series, a flux of alcohol series, a flux of ester series, and so forth. A baking temperature is preferably in a range of 150° to 600° C., and baking time is preferably in a range of 20 minutes to the order of 2 hours.

Now, with reference to a preferred embodiment, the invention will be described in more detail hereinafter, however, it is to be pointed out that the scope of the invention is not limited thereto in any way.

First Embodiment

A method of fabricating a colored filter

A transparent cylindrical body (made of Pyrex) 21, 11 mm in outside diameter, 9 mm in inside diameter, and 33 mm in length, having a slit 1 mm in width, was prepared.

Meanwhile, 3 g of a blue pigment MSDS {trade name: SF BLUE by Sanyo Shikiso K. K. (Sanyo Dyes Co. Ltd.)} was mixed with 10 ml of isopropyl alcohol, forming a mixture.

The transparent cylindrical body 21 was placed in a vertical position, and while the same was rotated around the axis thereof by use of a rotating apparatus, 3 to 4 drops of the mixture were dropped in the upper part of the inner surface 23 of the transparent cylindrical body 21. Rotation was continued for duration of 1 to 2 minutes, whereupon a uniform film of the pigment was formed in the inner surface 23 of the transparent cylindrical body 21. The uniform film of the pigment was dried at 120° C. for 3 to 6 hours, and subsequently, was baked at 400° C. for duration of 2 hours, thereafter being left out at room temperature for 1 hour.

Mounting of the colored filter

As shown in FIG. 2, in order to fit the colored filter 2 fabricated according to the first embodiment onto the glass tube 11 of the xenon lamp, installed on the seat 12 made of plastics, the colored filter is inserted between a lead wire 13 and the glass tube 11 after setting the slit 22 of the colored filter so as to be aligned with the connection 14 of the lead wire 13 and a lead wire 25 from a discharge tube 26 located inside tube 11.

The xenon lamp was turned ON to light up, whereupon the xenon lamp kept on emitting bluish white light for one hour, two hours, three hours, four hours, and even five hours thereafter in spite of the fact that white light usually came to be tainted with yellow color usually in 3 to 5 minutes in the case of the conventional xenon lamp.

Such a test on the same lamp was conducted 100 times, and results of any of the tests showed that light emitted by the lamp remained bluish white.

Upon checking the colored filter after testing for 500 hours, degradation in portions of the pigment was observed, however, no portion of the pigment as degraded was found peeling off because the colored filter 2 was snugly fitted onto the glass tube 11 of the xenon lamp.

It was confirmed that not only the colored filter for use in the xenon lamp or the halogen lamp, according to the invention, can be fabricated with ease, but also the same can emit stable and bluish white light without causing the pigment to peel off even after use for many hours because the pigment does not contain an organic binder susceptible to degradation.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A colored filter assembly for use in a xenon lamp having a glass tube with an outer periphery, a lead wire and a lead wire connection, said filter assembly comprising a colored transparent and rigid filter body having a cylindrical shape and being fitted over the outer periphery of the glass tube, said body defining therein a slit which extends longitudinally along the entire length thereof, said body having an inner surface coated solely with a baked-on pigment, and said slit being aligned with the lead wire and the lead wire connection during assembly of said body onto the glass tube.

2. The colored filter assembly of claim 1, wherein the xenon lamp includes a seat disposed adjacent one end of the glass tube, and said assembly includes a spring disposed between said body and the seat, said body being rotationally positioned relative to the glass tube such that said slit is angularly displaced from the lead wire connection to retain said body between the seat and the lead wire connection through the biasing force of said spring.

3. The colored filter assembly of claim 1, wherein said body is constructed of a transparent material resistant to temperatures of 600° C. or greater.

4. The colored filter assembly of claim 1, where said body is constructed of one of: Pyrex; and quartz.

5. The colored filter assembly of claim 1, wherein said pigment is at least one of: blue; yellow, red; green; and violet.

6. The colored filter assembly of claim 1, wherein said body is disposed between the lead wire and the glass tube.

7. A filter and lamp arrangement, said arrangement comprising:

a xenon lamp including a base, a glass tube having an outer periphery and projecting outwardly from said base, a discharge element disposed within said glass tube and having a first lead wire, a second lead wire connected to said first lead wire at a connection area; and a filter defined by a colored and transparent cylindrical filter body defining therein a slit which extends along the entire length of said body, said body being rigid and defining an inner surface which comprises a baked-on pigment coating, said body being disposed in surrounding relation with said outer periphery of said glass tube and said slit permitting the passage of said connection area therethrough during assembly of said filter onto said glass tube.

8. The arrangement of claim 7, including a spring disposed between said base and said body, said body being rotationally positioned relative to said glass tube such that said slit is angularly displaced from said connection area to retain said body between said base and said connection area through the biasing force of said spring.

9. The arrangement of claim 7, wherein said connection area is located adjacent one end of said glass tube opposite said base, said second lead wire projects outwardly from said base and is disposed adjacent said glass tube, said body being slidably inserted between said outer periphery of said glass tube and said second lead wire.

10. The arrangement of claim 7, wherein said filter is an entirely separate component from said lamp.

11. The arrangement of claim 7, wherein said pigment coating is blue.

12. The arrangement of claim 7, wherein said pigment coating contains a flux material, but not a binder material.

13. The arrangement of claim 7, wherein said body is constructed of a transparent rigid material resistant to temperatures of 600° C. or greater.

14. The arrangement of claim 13 wherein said body is constructed of one of: Pyrex; and quartz.

15. A method of assembling a filter onto one of a xenon and a halogen lamp, said method comprising the steps of:

providing a lamp including a base, a glass tube projecting outwardly from the base, a discharge element disposed within the glass tube and having a first lead wire, a second lead wire connected to the first lead wire at a connection area adjacent one end of the glass tube opposite the base;

providing a filter including a colored cylindrical and rigid filter body defining therein a slit which extends along the entire extent of the body, the body defining an inner surface which comprises a baked-on pigment coating;

aligning the slit of the body with the connection area of the lamp;

then sliding the body over an outer periphery of the glass tube such that the connection area is disposed within the slit; and then moving the body towards the base relative to the glass tube such that the connection area passes through the slit.

16. The method of claim 15, including providing a spring about the base, said step of moving includes moving the body towards the base until an outer end of the body passes the connection area, and thereafter rotating the body relative to the glass tube such that the slit is angularly displaced from the connection area to retain the body on the glass tube between the spring and the connection area.

17. The method of claim 16, wherein the second lead wire projects outwardly from the base adjacent the glass tube, and said step of sliding includes sliding the body over the outer periphery of the glass tube and between the second lead wire and the glass tube.

* * * * *